United States Patent [19]

Jones et al.

[11] Patent Number: 4,886,230

[45] Date of Patent: Dec. 12, 1989

[54] CAMERA AND OTHER INSTRUMENT SUPPORT STAND

[75] Inventors: John A. Jones, Gresham; L. Mark Marchus; Loren S. Hardy, both of Portland, all of Oreg.

[73] Assignee: Cineonix, Inc., Portland, Oreg.

[21] Appl. No.: 926,897

[22] Filed: Nov. 3, 1986

[51] Int. Cl.[4] .......................................... F16M 11/38
[52] U.S. Cl. .................................. 248/170; 248/181; 248/183; 248/288.5; 403/5; 403/37; 403/90; 403/145
[58] Field of Search ............... 248/168, 170, 183, 178, 248/177, 169, 171, 188.9, 288.3, 288.5, 181; 403/148, 145, 91, 90, 5, 37, 38, 39, 104

[56] References Cited

U.S. PATENT DOCUMENTS

| | | |
|---|---|---|
| D. 148,778 | 2/1948 | Fishter . |
| D. 257,260 | 10/1980 | Shiraishi . |
| D. 263,147 | 2/1982 | Iwasaki . |
| 857,034 | 12/1907 | Wright . |
| 1,764,721 | 6/1930 | Hayden . |
| 2,341,751 | 2/1944 | Willoughby . |
| 2,455,525 | 12/1948 | Schulz . |
| 2,463,655 | 3/1949 | Temple, Jr. .......................... 248/168 |
| 2,591,051 | 4/1952 | Caldwell . |
| 2,592,941 | 4/1952 | Moore . |
| 2,744,712 | 5/1956 | Brandt . |
| 2,865,133 | 12/1958 | Hoven et al. ..................... 248/188.9 |
| 2,956,764 | 10/1960 | Nakatani . |
| 3,133,719 | 5/1964 | Beck . |
| 3,254,868 | 6/1966 | Quaas et al. .................. 248/188.9 X |
| 3,277,409 | 1/1966 | Pagliuso . |
| 3,575,369 | 4/1971 | Tetlow ................................. 248/158 |
| 3,795,378 | 3/1974 | Clarke . |
| 3,851,399 | 12/1974 | Edwards . |
| 3,921,947 | 11/1975 | Adam . |
| 4,010,923 | 3/1977 | Miller et al. . |
| 4,039,158 | 8/1977 | Weman . |
| 4,113,215 | 9/1978 | Stapleton ............................. 248/183 |
| 4,177,967 | 12/1979 | Marchus ............................... 248/178 |
| 4,226,303 | 10/1980 | Thoma . |
| 4,249,817 | 2/1981 | Blau ................................. 248/183 X |
| 4,317,552 | 3/1982 | Weidler . |
| 4,368,996 | 1/1983 | Davis et al. ............................. 403/5 |
| 4,422,683 | 12/1983 | Charonnat . |
| 4,450,353 | 5/1984 | Sjolund et al. . |
| 4,557,623 | 12/1985 | Tella .................................. 403/90 X |
| 4,562,985 | 1/1986 | Nakatani . |

FOREIGN PATENT DOCUMENTS

| | | | |
|---|---|---|---|
| 2203196 | 8/1973 | Fed. Rep. of Germany | 248/171 |
| 3134910 | 3/1983 | Fed. Rep. of Germany . | |
| 3238915 | 4/1984 | Fed. Rep. of Germany . | |
| 1216881 | 11/1959 | France . | |
| 2528996 | 12/1983 | France . | |
| 78329 | 1/1955 | Netherlands | 248/170 |
| 1377897 | 12/1974 | United Kingdom . | |
| 2168149 | 6/1986 | United Kingdom . | |

*Primary Examiner*—Alvin C. Chin-Shue
*Assistant Examiner*—David L. Talbott
*Attorney, Agent, or Firm*—Klarquist, Sparkman, Campbell, Leigh & Whinston

[57] ABSTRACT

A camera supporting tripod is described with a hip to which legs are attached. The legs are adjustable as to length. In addition, the tripod includes a center shaft mounted to the hip for tilting movement. The center shaft is also adjustable as to length. Manually actuated hydraulic mechanisms are provided for releasably holding the legs as to length, for releasably locking the center shaft to the hip to prevent relative tilting, and for releasably holding the shaft at the length to which it is adjusted. An instrument supporting head on the tripod includes friction brake panning and tilting mechanisms designed to apply a variable drag to these motions and also for smooth operation.

35 Claims, 7 Drawing Sheets

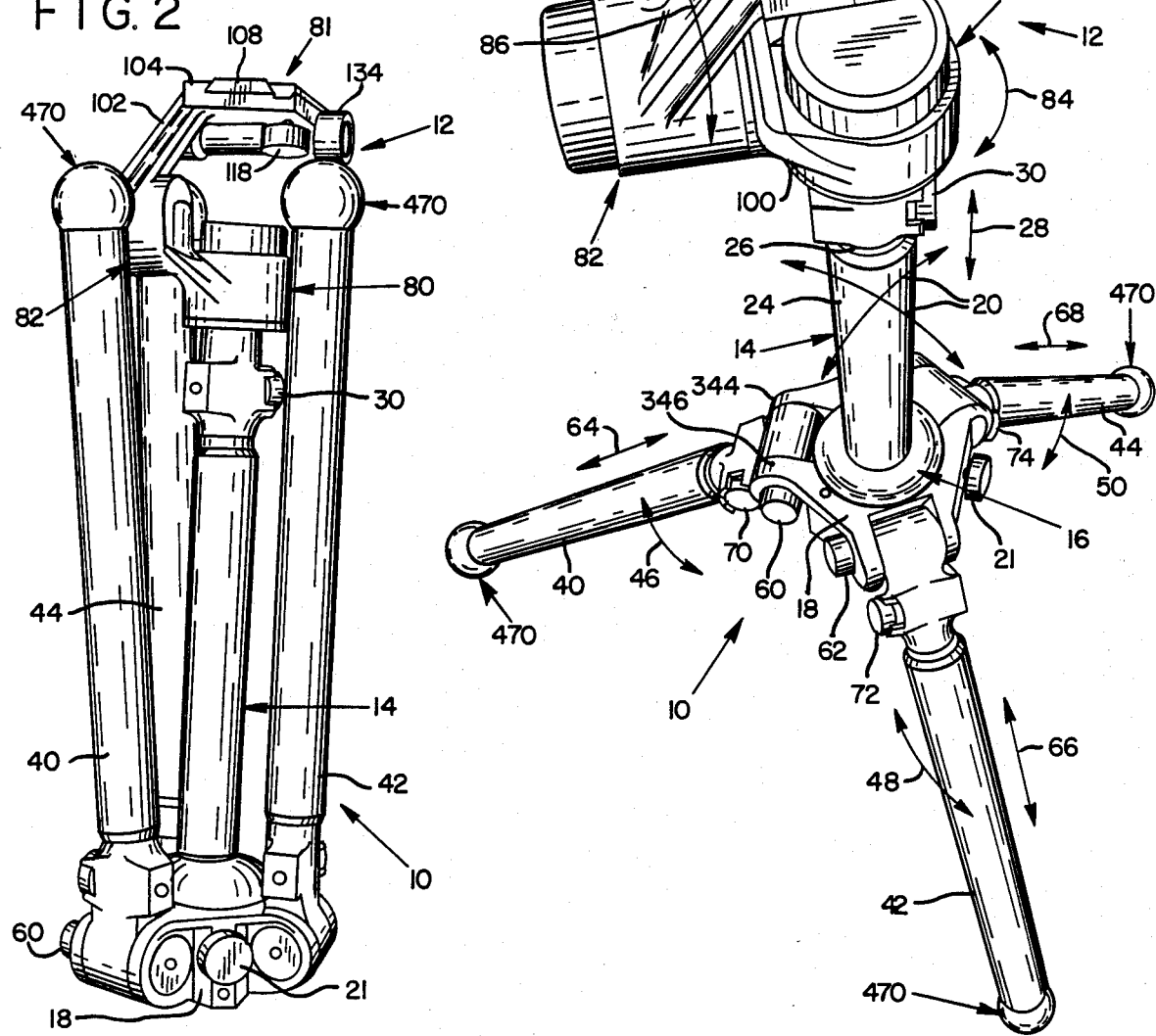

FIG. 12
FIG. 13
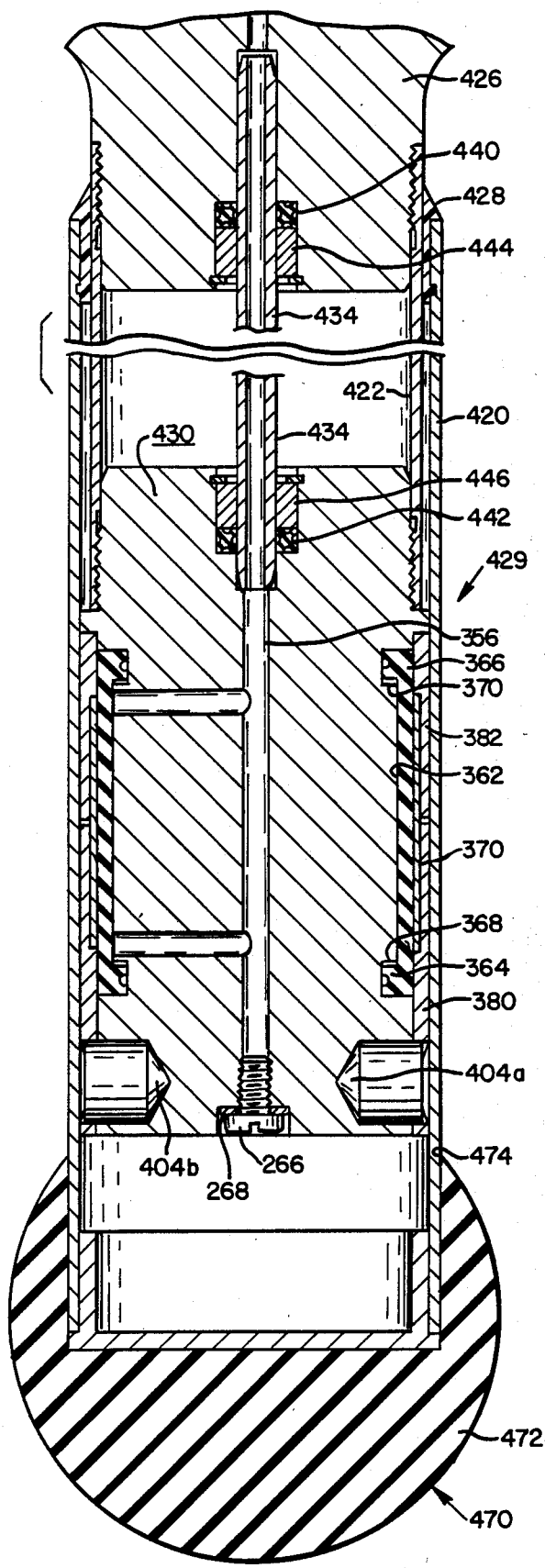
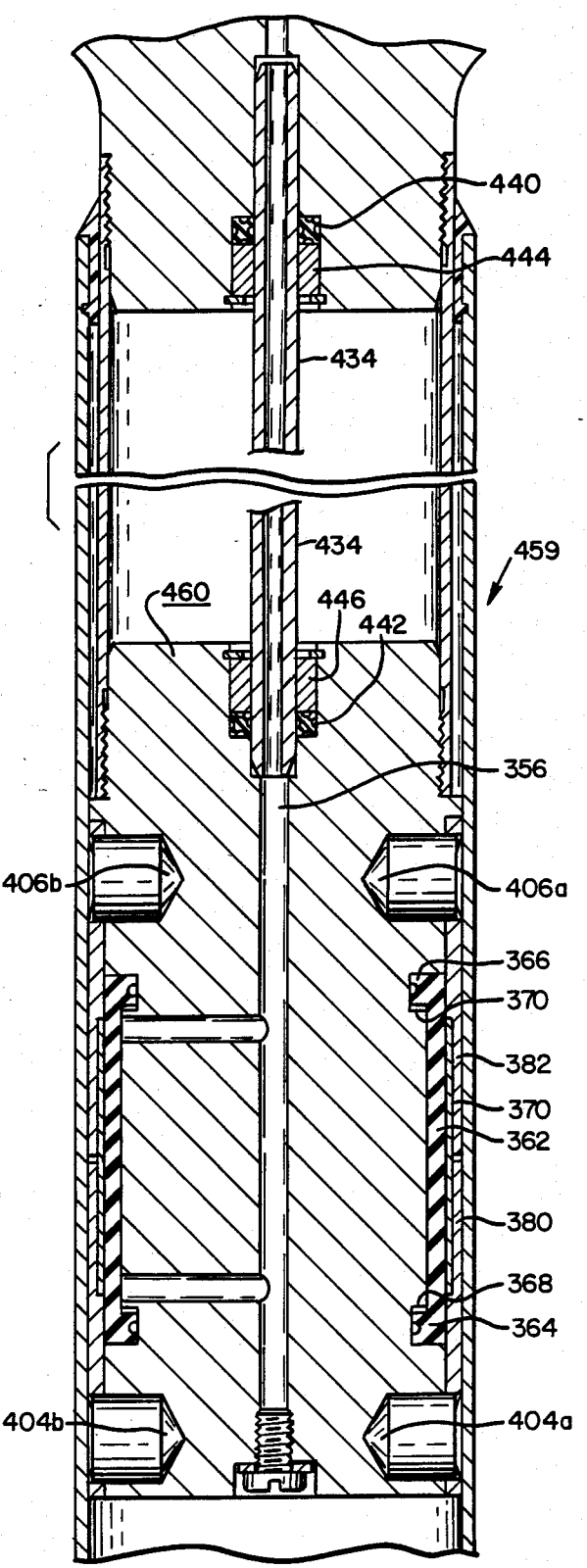

CAMERA AND OTHER INSTRUMENT SUPPORT STAND

FIELD OF THE INVENTION

The present invention relates to tripods and other stands for supporting cameras, transits, and other instruments, and also to instrument supporting heads which support the instruments on the stand.

DESCRIPTION OF THE PRIOR ART

Prior art instrument support stands, and in particular tripods used in cinematographic applications to support motion picture cameras, suffer from a number of disadvantages.

Tripods used for this purpose frequently are used to support cameras weighing anywhere from 15 to 100 pounds or more, and which can cost in excess of $15,000. When a heavy camera is mounted to a typical prior art tripod device, the assembly is extremely top-heavy. As a result, the camera is not stably supported, particularly when used in heavy cross winds and on uneven terrain. Naturally, the user of this expensive equipment becomes very nervous and worried about the equipment under these conditions, which can detract from the user's concentration and result in less than ideal photographs.

In an attempt to overcome this instability, it is not unusual for equipment operators to suspend heavy weights between the legs of a tripod. This is done to lower the center of gravity of the tripod and to thereby add a greater degree of stability to the tripod during use. However, the need to add weights for stability adds to the difficulty of setting up the tripod and moving it from one location to another. Also, under adverse conditions, a camera operator will sometimes have one or more individuals hold on to a tripod to help anchor the tripod in place during use. This prevents these individuals from performing other more productive tasks.

Moreover, cameras of this type typically are used with long relatively heavy lenses. These lenses contribute to the instability of a tripod supported camera, particularly if the center of gravity of the camera and lens is not positioned directly over the center of the tripod. Moreover, if the camera happens to flop forward, the center of gravity may be shifted enough to tip the entire tripod over.

In addition to instability problems, existing tripods are typically relatively difficult and time consuming to set up, especially in cramped quarters or where a flat supporting surface is not available. This limits the number of setups of the tripod from which photographs may be taken during a limited photograph shooting time. Also, more than one person is required to set up many types of prior art tripod devices. Furthermore, with many tripod devices, the legs must be adjusted to level a camera. This can be extremely difficult, particularly where the legs include spreaders that must be loosened and then retightened in order to adjust the position of the legs.

Another significant drawback of known tripods used in cinematography is their lack of rigidity. They simply tend to deflect too much during use, thereby interfering with a photographer's work.

Camera supporting heads for mounting to tripods are also known. In addition, many heads of this type permit panning of the camera about a vertical axis, as well as tilting of the camera about a horizontal axis. In a first known type of head, fluid in the head passes through an orifice or by a blade to apply drag to the head movement. However, with these types of devices, it is extremely difficult to accelerate or deccelerate the head, particularly where a smooth change of panning or tilting movement is desired. In addition, heads having friction mechanisms for applying drag to the panning and tilting movement are also known. However, heads of this type known to the inventors provide an uneven feel to a photographer when the photographer shifts from a panning to a tilting motion. In particular, the camera on such heads tend to "square out" when shifted from a panning to a tilting movement, rather than making a gradual or smooth transition. In addition, friction heads of this type are typically either operable at their initial drag condition or are locked in place with a separate locking mechanism. That is, it is extremely difficult to set these heads to a drag which is between the initial drag and locked conditions as very little adjustment capabilities exist.

It is also desirable to provide a mechanically simple and cost effective camera supporting tripod which elements struts, spreaders and the like which can interfere with a photographer's work. Moreover, known prior art tripods lack versatility for use in the widely variable environmental conditions frequently encountered by photographers who work outside of a photographic studio. In addition, prior art tripods and heads are typically designed for cameras of a given narrow range of weight. Therefore, different tripods are used when a photographer plans to use different size and weight cameras.

U.S. Pat. No. 875,034 of Wright exemplifies these prior art devices. In Wright, a platform is mounted to three legs of fixed length. A short stub shaft has a lower ball positioned in a socket on the platform. The ball is locked in place by mechanically clamping the socket against the ball. A camera is mounted to a plate carried at the upper end of the stub shaft. A pair of bubble levels are mounted to this upper plate for use in leveling the camera after the tripod is set up. Devices such as shown in Wright suffer from a number of the above drawbacks, including an apparent lack of rigidity and inability to stably support a relatively heavy camera.

British Pat. No. 1,377,897 of O'Conner is still another example of a prior art tripod device. In O'Conner, three legs of fixed length are pivoted to a lower body portion of this device. Hydraulic struts are used to adjust the position of the legs. In this device, a single valve is opened to enable the legs to be adjusted to various positions relative to the body of the apparatus. The valve is then closed to lock the hydraulic struts and thus the legs in position. A center shaft of adjustable length extends upwardly in a fixed direction from the lower body portion. Wedge blocks and pins are used to lock telescoping sections forming the shaft to set the shaft length. The O'Conner device also suffers from a number of the above drawbacks. In particular, the tripod of this patent would not appear to be highly stable in crosswinds or when used on substantially uneven terrain. In addition, the device of this patent lacks versatility. For example, the positions of the various legs are understood to be adjusted in unison and the legs are of a fixed length.

U.S. Pat. No. 3,795,378 of Clark discloses a tripod having a platform which is adjusted to a desired level or angle by delivering hydraulic fluid to telescoping legs of the device. Hydraulic fluid is supplied in unison to the legs to adjust their relative lengths and setup the tripod. The tripod of Clark has a relatively bulky hydraulic fluid reservoir positioned between the tripod legs where it can hamper a photographer's movements. Also, this device appears to lack the rigidity and stability desired in tripod applications.

In addition, attachments for tripod heads are known which enable a user's torso to control tilting and panning movement of the head. A device of this type is shown in U.S. Pat. No. 4,177,967 of Marchus.

In view of the above, a need exists for an improved instrument supporting stand, such as of the tripod type. A need also exists for an improved instrument support head for such a stand.

SUMMARY OF THE INVENTION

The present invention comprises a support stand and head for an instrument such as a camera, which includes the following features either alone or in combination with one another:

(a) An upright instrument supporting body, at least three legs, leg pivot means each associated with a respective one of the legs for coupling the legs to the body for pivoting about respective generally horizontal pivot axes to various positions relative to the body, and manually actuated hydraulic leg position locking means for selectively and independently locking each of these legs in position relative to the body;

(b) The body having a hip to which the legs are mounted and an elongated upright shaft with a lower end formed in a ball and mounted to the hip for universal tilting movement on the hip within limits, and manually actuated hydraulic hip locking means for selectively locking the ball and thereby the shaft against tilting movement relative to the hip;

(c) The legs being adjustable as to length and the apparatus including manually actuated hydraulic leg length locking means for selectively and independently releasably holding each of the legs in any position of adjustment as to length;

(d) The center shaft being adjustable as to length and the apparatus including manually actuated hydraulic means for releasably holding the shaft in adjustment as to length;

(e) A camera or instrument mounting head supported by the upper end of the shaft, the head including panning mounting means for coupling the head to the shaft for panning motion about a generally vertical axis, the head including an instrument support member and tilt mounting means for mounting the instrument support member to the head for tilting movement about a generally horizontal tilt pivot axis, the panning mounting means and tilt mounting means each comprising manually adjustable friction brake means for varying the drag on the panning and tilting movement, the friction brake means each including plural friction engagement means of a material having substantially equal coefficients of dynamic and static friction, the friction engagement means being positioned for frictional engagement, and means for varying the force with which the friction engagement means engage one another to vary the drag;

(f) The friction brake means each including means for modulating the force applied to the friction engagement means;

(g) The head being configured to support the instrument carrying support member at a position spaced from the upper end of the shaft, thereby providing a substantial gap between the support member and shaft, this gap accommodating a user's hands for camera and other instrument adjustments during use of the tripod;

(h) The legs being configured as a tripod and pivotal relative to the hip through an arc of approximately 180 degrees;

(i) Each leg having a wall bounding a pivot pin receiving opening through an upper end thereof and oriented such that the pivot pin receiving opening has a substantially horizontal axis, the hip including plural pivot pin means, one such pivot pin means being associated with each leg and received in the pivot pin receiving opening of the associated leg, the pivot pin means comprising means for pivoting each of the legs to the hip for pivoting about respective substantially horizontal pivot axes, each pivot pin means being selectively expandable in outside dimension to releasably grip the wall of the associated pivot pin receiving opening and thereby lock the legs against movement relative to the hip, and leg position locking means comprising means for selectively expanding the pivot pin means in outside dimension to lock the legs against movement relative to the hip;

(j) Each leg including a first tubular leg section and a second tubular leg section telescopingly received by the first leg section, the second leg section including a leg length locking portion expandable in outside dimension for gripping the first leg section to lock the two leg sections against relative movement and thereby releasably hold the length of the leg, and leg length locking means for selectively and independently expanding the leg length locking portions in outside dimension to lock the first and second leg sections against relative movement;

(k) The center shaft including a first tubular section and a second tubular section telescopingly received by the first section, the second section including expandable shaft locking means for expanding in outside dimension to releasably grip the first shaft section and restrain the shaft sections from further relative movement, thereby releasably holding the center shaft at a fixed length;

(l) A cap or foot for the lower end of each leg having a body with a hemispherical lower portion, means for connecting the body to the end of the leg, the body being of material with a durometer which is in the range of from 40 to 90, the body having a coefficient of friction which is similar to that of natural rubber or neoprene, and the hemispherical portion of the body having a diameter which is approximately from one to two times the cross-sectional dimension of the leg to which the body is mounted; and/or (m) The cap more specifically having a body which is generally spherical, having a durometer from 60 to 65, and a diameter which is from 1.25 to 1.35 times the cross-sectional dimension of the leg to which the body is mounted.

It is accordingly an overall object of the present invention to provide an improved support for a camera or other instrument.

A still further object of the invention is to provide an improved instrument support head, capable of panning and tilting movement, for supporting a camera or other instrument on a tripod or other stand.

Another object of the present invention is to provide an improved tripod for cameras and other instruments.

Still another object of the present invention is to provide a highly stable and rigid camera support;

Another object of the present invention is to provide a tripod which is easy and quick to setup.

A further object of the present invention is to provide a tripod which is extremely versatile for use in a wide variety of applications.

Still another object of the present invention is to provide a tripod which can be collapsed to a relatively small size for easy transportation and storage.

Another object of the present invention is to provide a tripod which is usable by individuals of widely varying heights.

Still another object of the present invention is to provide a tripod for stabling supporting cameras and other instruments of a wide range in weight.

It another object of the present invention to provide a camera head which provides a uniform feel to a photographer as it is panned and tilted.

A further object of the present invention is to provide a camera head which is capable of applying variable resistance or drag to panning and tilting movement.

A still further object of the present invention is to provide a tripod which is durable and yet is relatively mechanically simple for the versatility provided by the device.

These and other features, objects and advantages of the present invention will become apparent with reference to the following description and drawings.

BRIEF DESCRIPTION OF THE DRAWINGS

FIG. 1 is a front top perspective view of an instrument supporting stand and head in accordance with the present invention;

FIG. 2 is a perspective view of the apparatus of FIG. 1, shown in a fully collapsed state;

FIG. 12 is a vertical sectional view of a lower portion of a leg of the apparatus of FIG. 1, showing a portion of a leg length locking mechanism included in the leg; and FIG. 13 is a vertical sectional view through a portion of the upright center shaft of the apparatus of FIG. 1, showing a portion of the shaft locking mechanism included therein.

DETAILED DESCRIPTION OF PREFERRED EMBODIMENT OVERALL DESCRIPTION

Figure 4:
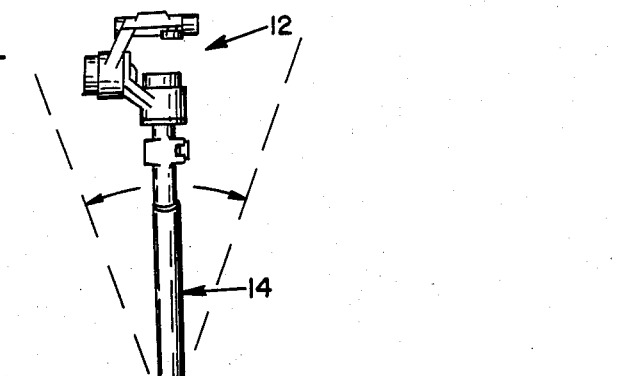
FIG. 4 is a perspective view of the apparatus of FIG. 1, shown in a further position of adjustment.

With reference to FIGS. 1 through 5, the illustrated support stand in accordance with the present invention comprises a tripod 10. This tripod is suitable for supporting a multitude of types of instruments, including transits and cameras. Although not to be construed as a limitation, the description proceeds with reference to a camera supporting application. In this case, a camera supporting head 12 is mounted to the tripod 10.

The tripod 10 includes a body having an upright center shaft 14 with its lower end 16 mounted to a hip 18 of the body for universal tilting movement on the hip within limits. This tilting movement is indicated schematically by arrows 20 in FIG. 1. A hip locking means is provided for selectively locking the shaft 14 against tilting movement relative to the hip. As explained in greater detail below, the preferred form of this locking means comprises a manually actuated hydraulic hip locking mechanism. This mechanism is controlled by rotating a knob 21 in one direction to selectively release the shaft 14 for tilting movement and by rotating the knob in the opposite direction to lock the shaft against such movement.

The shaft 14 is comprised of first and second telescoping tubular shaft sections 24, 26. These sections are capable of relative sliding movement as indicated by arrow 28 to adjust the length of the shaft 14 and thus the height of head 12. A shaft length locking mechanism is provided for releasably holding shaft sections 24, 26 against relative movement to thereby hold the shaft in adjustment as to length. In the preferred form, this shaft length locking mechanism comprises a manually actuated hydraulic means, described below, for releasably holding the shaft in adjustment. A knob 30 is rotated as required to selectively lock and unlock the shaft sections 24, 26.

Figure 3:
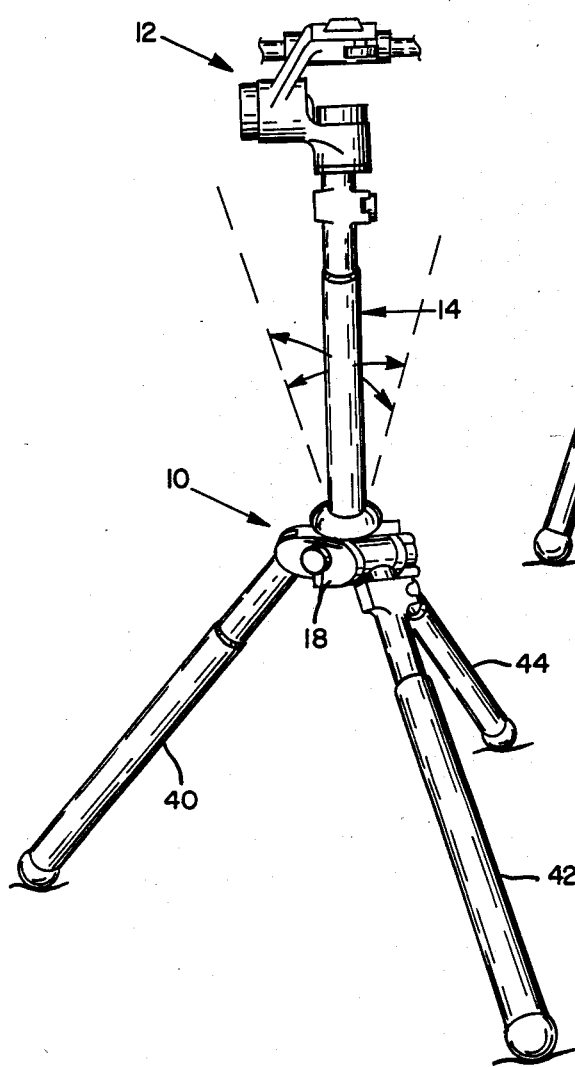
FIG. 3 is a perspective view of the apparatus of FIG. 1, shown in one position of adjustment.
Figure 5:
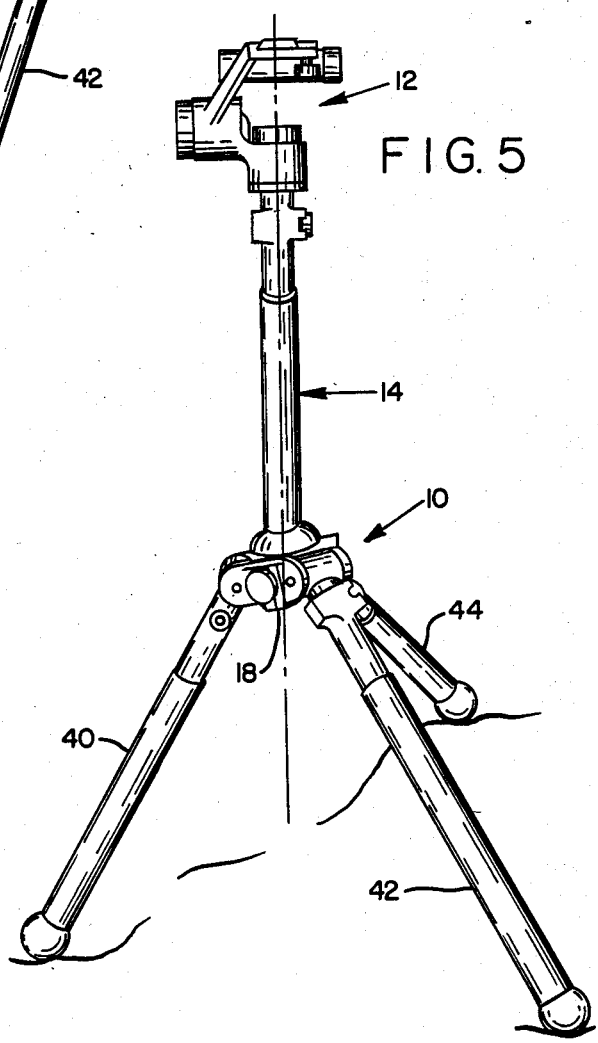
FIG. 5 is a perspective view of the apparatus of FIG. 1, shown in still another position of adjustment.

The tripod 10 includes three legs 40, 42 and 44. These legs are adjustably mounted to the hip 18 so as to project from the hip in various directions (such as shown in FIGS. 3–5) to stably support the body and so as to permit collapsing of the legs against the shaft 14 (such as shown in FIG. 2). In the illustrated embodiment, legs 40, 42 and 44 are pivoted to hip 18 for pivoting about respective horizontal axes in directions generally indicated by arrows 46, 48 and 50.

A leg position locking means is provided for selectively locking each of the legs in position and against movement relative to the hip. In the illustrated form, this leg position locking means comprises means for independently locking each of the legs against movement relative to the hip. In particular, such means may comprise manually actuated hydraulic leg position locking means for locking the respective legs in any position of adjustment relative to the hip. Knobs 60 and 62 are rotated to selectively lock and unlock the legs 40, 42 in position. A similar knob, not shown, is rotated to lock the leg 44 in place. The details of this form of leg position locking mechanism are described below.

The legs 40, 42 and 44 are also adjustable in length and a mechanism is provided for releasably holding the legs in adjustment. Arrows 64, 66 and 68 indicate the leg length adjustment feature. The leg length locking mechanism, in the illustrated embodiment, comprises manually actuated hydraulic leg length locking means for selectively and independently releasably holding each of the legs in any position of adjustment as to length. Knobs 70, 72 and 74 are rotated to control the leg length locking mechanisms. These mechanisms are operable as explained below to lock and release the legs for length adjustment.

Figure 7:
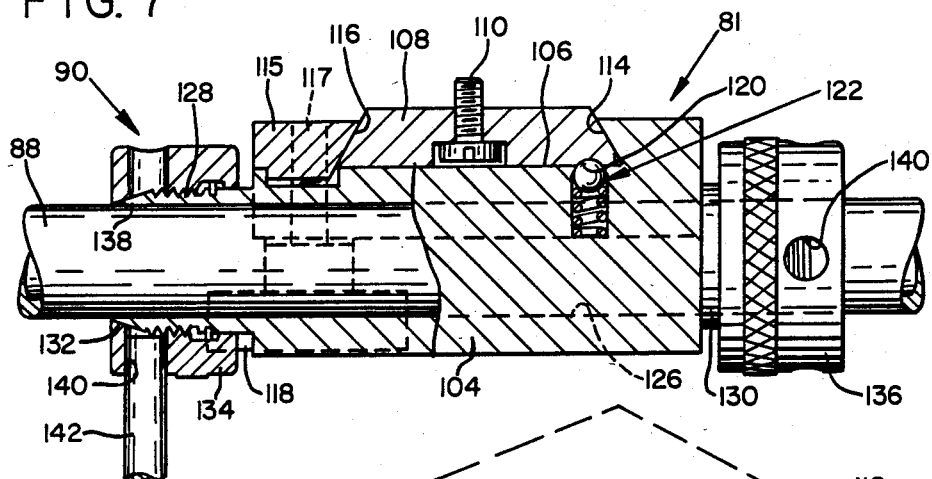
FIG. 7 is a sectional view of the portion of the head used to couple the camera and guidance apparatus to the head.

The instrument supporting head 12 includes a panning mounting means 80 for coupling the head 12 to shaft 14 for panning motion about the shaft axis, which is typically in a generally vertical orientation. The head also includes an instrument support member, indicated generally at 81 and described in detail below. A tilt mounting means 82 mounts the instrument support member to the head for tilting movement about a generally horizontal tilt pivot axis. In FIG. 7, panning movement is indicated by arrow 84 and the tilting movement is indicated by arrow 86. A lever arm 88, with a handle 89, is coupled to the head 12 by a coupling mechanism 90 as explained below. Lever 88 may be shifted by a photographer to provide leverage for controlling panning and tilting motion of the head 12.

As explained in greater detail below in connection with the operation of the apparatus, a tripod and head assembly in accordance with the present invention is extremely versatile. In addition, legs 40, 42 and 44 are capable of pivoting through an arc of approximately 180 degrees. As a result, the legs may be pivoted against shaft 14, as shown in FIG. 2, and then locked in place to provide a compact easily storable and transportable apparatus. In addition, shaft sections 24 and 26 may be collapsed as well and locked in place as shown in this figure. Moreover, with reference to FIGS. 3–5, the legs may be adjusted to any position and length for use in virtually any terrain.

In addition, although not shown in these figures, a level sensor may be mounted to shaft 14 adjacent head 12. One suitable level sensor is shown in U.S. patent Ser. No. 926,911, by John A. Jones, entitled Level Sensing and Indicating Apparatus and filed on the same day as the present application. When such a level sensing apparatus is used, or any other suitable level sensor, the legs 40, 42 and 44 are adjusted in length to position shaft 14 in a generally vertical orientation. The hip lock mechanism is then released, by loosening knob 21, to permit tilting of the center shaft 14 until such time as the level sensor indicates that the shaft 14 is vertical. Knob 21 is then tightened to lock shaft 14 against further tilting. With the level sensor positioned adjacent head 12, and given the substantial length of elongated shaft 14, the shaft may be pivoted in any direction through a substantial angle to accomplish this leveling.

Camera Supporting Head

The camera or instrument support head 12 is best seen in FIGS. 1, 6, 7 and 8 and will be described with reference to these figures. As shown in FIG. 1, the instrument support structure 81 is spaced from the upper end of shaft 14 and also from the panning mounting means 80 to provide a substantial gap therebetween. A user of the tripod can insert his or her hands into the gap for access to camera and other instrument adjustment mechanisms. This makes head 12 more convenient to use. In the illustrated head 12, a tilt mechanism supporting arm 100 is angled upwardly and outwardly from the panning mounting mechanism 80. Arm 100 carries the tilt mounting mechanism 82. A similar arm 102 extends upwardly and inwardly from the tilt mounting mechanism. Arm 102 terminates in a camera supporting base plate 104, which is shown positioned above shaft 14 in FIGS. 1 and 6.

Figure 6:
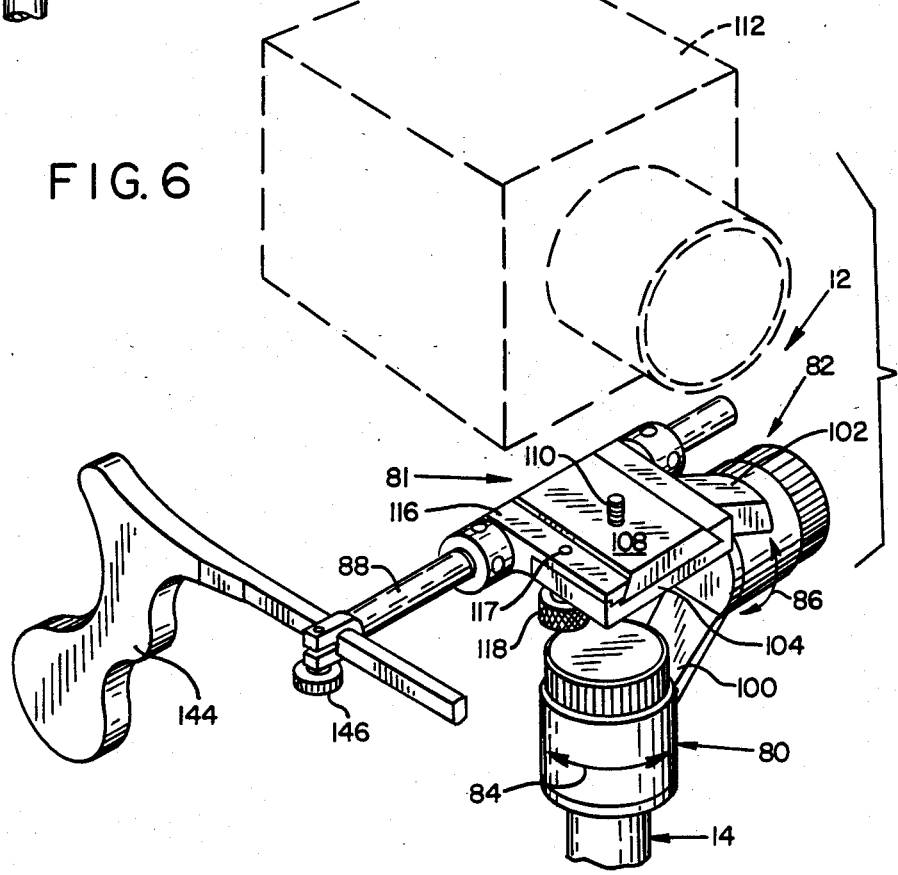
FIG. 6 is a perspective view of the instrument supporting head portion of the apparatus of FIG. 1, with a camera shown in dashed lines, and with a guidance apparatus coupled to the head.

As best seen in FIG. 7, base plate 104 has an upper planar instrument supporting surface 106 for slidably receiving a camera mounting plate 108 of trapezoidal cross section. Plate 108 has a camera mounting bolt 110 for connection to a mounting aperature in a camera 112. As shown in FIG. 7, plate 104 is formed with an overhanging lip 114 contoured to overlie and engage a side edge of mounting plate 108. A locking bar 115 has a tapered edge 116 contoured for engaging the opposite side edge of mounting plate 108. Locking bar 115 threadedly receives the upper end of a bolt 117, which extends through a portion of the base plate 104. Bolt 117 is connected at its lower end to a knob 118. Knob 118 is rotated in one direction to clamp locking bar 115 against the edge of mounting plate 108 to secure plate 108 to plate 104 and thus to the head. Rotation of knob 118 in the opposite direction releases bar 115 and the plates 104, 108. The underside of mounting plate 108 is provided with a detent opening for receiving a spring biased detent 122 when mounting plate 108 is slid on mounting surface 106 to its mounted position as shown in FIGS. 1, 6 and 7.

Typically, mounting plate 108 is slid free of base plate 104. When these elements are separated, the mounting plate is then secured to the underside of camera 112 by bolt 110. Thereafter, the mounting plate is slid on surface 106 until the detent 122 engages detent opening 120. Locking bar 115 is then tightened to securely mount camera 112 to the instrument supporting head 12. In addition, mounting plate 108 is locked to base plate 104 in a position such that the center of the camera is tilted by tilt mechanism 82 in a plane which contains the axis of shaft 14. This adds stability to the supported camera because an even side to side weight distribution is provided.

With further reference to FIG. 7, the base plate is provided with a transversely extending opening 126 through which lever 88 is inserted. Opening 126 extends through collet receiving projections 128, 130 which project outwardly from the base plate 104. The outer ends of these projections, one being shown in FIG. 7, terminate in an annular tapered surface 132. Collets 134, 136 are threaded onto the respective projections 128, 130. Collets 134 is provided with an annular wedging surface which engages the surface 132. As collet 134 is tightened, the projection 128 is clamped against the lever 88 to releasably secure the lever in place. Collet 136 is similarly constructed. Collets 134, 136 are also provided with openings 140 spaced about their perimeters. Rods, such as 142, are inserted into these openings and used to tighten the collets to secure the lever 88 in place.

A torso engageable guide 144, such as disclosed in U.S. Pat. No. 4,177,967 of Marchus, may be mounted by a mounting mechanism 146 to the lever 88 in place of the handle 89 shown in FIG. 1. The height of the tripod 10 is adjusted to position the upper portion of the guide 144 at the upper torso or shoulder level of an individual using the tripod. The guide is also adjusted toward and away from the user until it is comfortably positioned to engage the user's shoulder with the lower portion of the guide extending between the user's upper arm and upper torso. Mechanism 146 is then tightened to hold guide 144 in adjustment. The portion of the guide 144 extending between the upper arm and upper torso is conveniently gripped by pressing the upper arm and the guide 144 against the upper torso. When this is done, as the user's upper torso is moved, the head 12 is also moved in a graceful manner in accordance with the fluid movements of the individual user. Rapid, discontinuous and exaggerated movements of the head 12 are prevented since the upper body of the user does not move in this manner. Furthermore, control of the head by the upper torso frees the user's hands for other purposes, such as advancing film and adjusting the camera.

Figure 8:
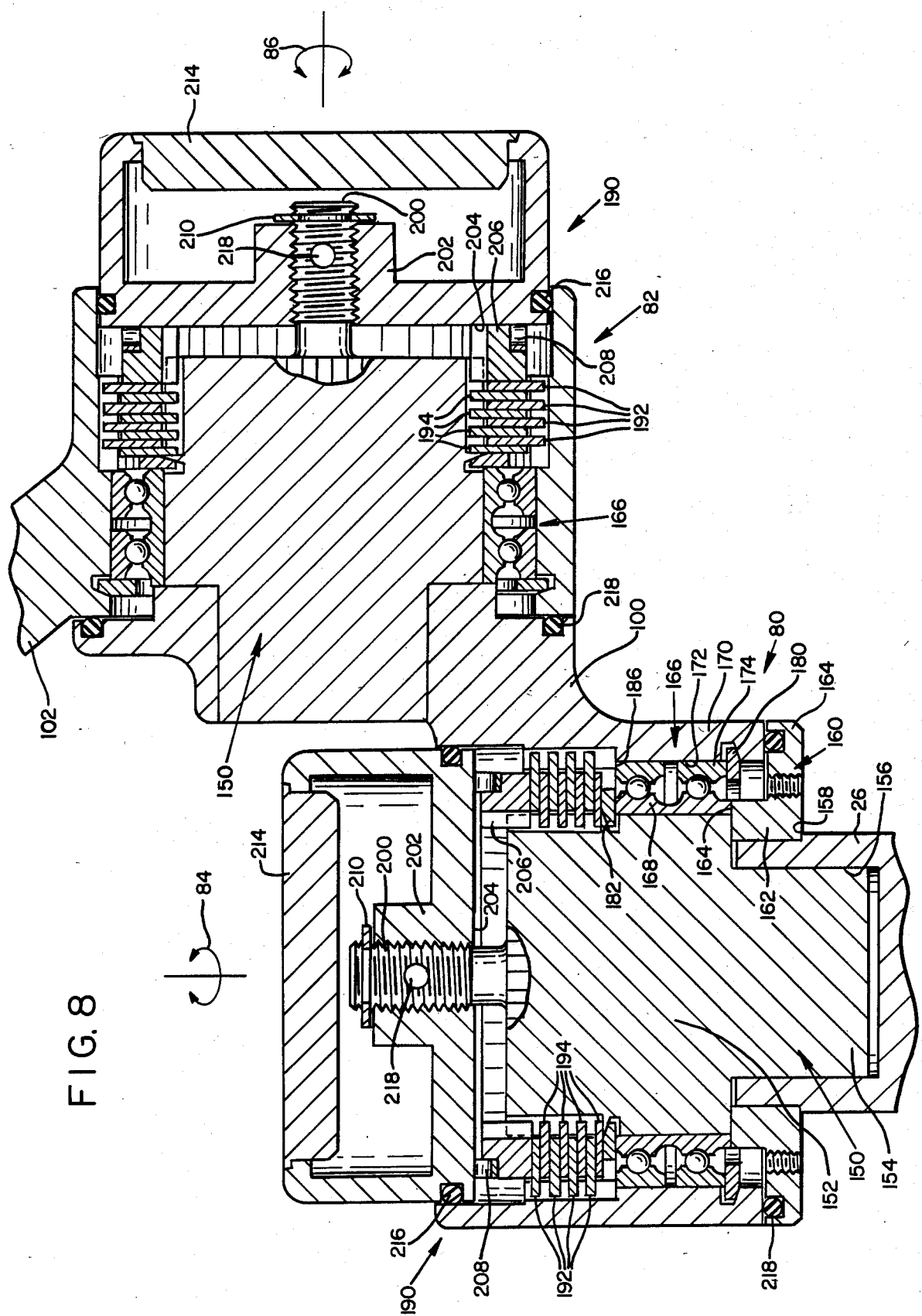
FIG. 8 is a vertical sectional view taken through panning and tilting friction brake mechanisms included within the head of the FIG. 1 apparatus.

The internal construction of the illustrated panning and tilting mechanisms 80, 82 is best seen in FIG. 8. Since each of these mechanisms 80, 82 is identical, only the panning mechanism 80 will be described in detail. However, like elements of mechanisms 80 and 82 are designated with like numbers.

The panning mechanism 80 includes a central block 150 of circular cross section. Block 150 has an enlarged upper portion 152 and a lower neck portion 154 inserted into a socket 156 at the upper end of tubular shaft section 26. Block 150 is fastened to the shaft section at neck 154. The upper end of shaft section 26 is of reduced outside dimension to provide a shoulder 158 which supports an annular collar 160. This collar is of L-shaped cross section with vertical and horizontal legs 162, 164. Leg 162 is sized larger in outside cross-sectional dimension than block 152 so as to provide an annular shelf 164 as shown in FIG. 8. An annular bearing 166 is included in this assembly. Bearing 166 has inner races 168 which abut shelf 164 and surround the block section 152. Arm 100 has a base section or mount 170 with a circular bore 172. The lower portion of mount 170 is positioned above collar leg 164 and is coupled to the outer race 174 of bearing 166. With this construction, arm 100, and the remaining portions of the instrument supporting head 12, are pivotal about the axis of the tripod shaft as indicated by arrow 84 in FIG. 8. Mount 170 has an annular lip 186 which abuts the upper end of bearing race 174. Annular wedging rings 180, 182 are received within respective grooves of mount 170 and block section 152. Wedge ring 182 compresses inner bearing races 168 while wedge ring 180 preloads the outer bearing race 174 against lip 186.

The panning mechanism 80 also includes a manually adjustable friction brake 190 for varying the drag on panning movement. In the illustrated embodiment, the friction brake includes plural friction engagement means such as annular disk pads 192, 194. These disk pads 192, 194 are mounted respectively to an upper portion of mount 170 and to the block section 152. The disks 192, 194 are stacked as shown so that respective upper and lower surfaces of the disks abut one another. In operation, these disks are pressed together with varying degrees of force to vary the drag on panning movement.

The friction brake 190 shown in FIG. 8 includes a means for modulating the force applied to the friction pads 192, 194. More specifically, an externally threaded shaft 200 extends upwardly from the upper end of block section 152. A pressure applying cap 202 is threaded onto shaft 200. This cap has a lower bearing surface 204 which is shifted axially along shaft 200 toward and away from block section 152 as the cap 202 is rotated in respective opposite directions. A friction pad engaging collar 206 surrounds block section 152. Collar 206 is slidable relative to this block section 152 and also relative to the mount 170. The illustrated force modulation means comprises an annular wave spring washer 208 which rests on a step provided in collar 206. Wave spring 208 is compressed as the bearing surface 204 is moved toward the block section 152.

This construction permits fine adjustment of the drag on the panning movement. For example, cap 202 and wave spring 208 are typically designed so that the cap can rotate substantially (for example, through two complete revolutions) between an unbraked position and a locked position. In the unbraked position, little or no force is typically applied to the pads 192, 194. However, this unbraked position, which is established by the position of a retaining ring 210 on shaft 200, may be set so that wave spring 208 is partially compressed when the upper surface of cap 202 engages retainer 210. In this case, a minimum drag exists. The magnitude of this minimum drag depends upon the compression of wave spring 208 in this state. In comparison, in the fully locked state, bearing surface 204 abuts the upper end of collar 206, for example as shown in connection with locking mechanism 82 in FIG. 8, so that pads 192 and 194 tightly grip one another and lock the device against panning movement. In the absence of such a force modulating means, rotation of cup 202 through as little as five degrees would shift the brake from an unlocked to a locked state. This would not permit any reliable degree of drag adjustment. Therefore, with this construction, a user may easily adjust the drag to panning movement over a wide range.

As also shown in FIG. 8, a removable decorative cover 214 may be mounted to cap 202. In addition, O-ring dust seals 216, 218 substantially seal the braking mechanism 190 from the environment. A friction button 218 of, for example, Nylon material, may be mounted to shaft 200 for bearing against cap 202. This button prevents the cap 202 from turning as the instrument supporting head is panned.

As another important aspect of the friction braking mechanism, in the preferred embodiment the disks 192 and 194 are made of a material with substantially equal coefficients of static and dynamic friction. Consequently, if panning or tilting motion is either accelerated or decelerated, the drag remains substantially constant and at the setting established by the user. In addition, by using disk pads having similar dynamic and static coefficients of friction in both the panning and tilting mechanisms, smooth transitions between panning and tilting are permitted. That is, a user of the device can pan the instrument supporting head and gradually tilt the head in a smooth manner.

As a specific example, the disks 192, 194 may be of a carbon-fiber reinforced composite material, such as nylon 6/6 grade RCL-4536 material from LNP Thermo Comp Corporation. This material is typically used in bearings and is not known to the inventors to have been used in friction brakes. Of course, any suitable material having substantially equal coefficients of static and dynamic friction would also have these desirable characteristics.

It should be noted that the structural components of the head, as well as of the tripod, are typically of a rigid lightweight material, such as aluminum.

Hip Locking Mechanism

Figure 9:
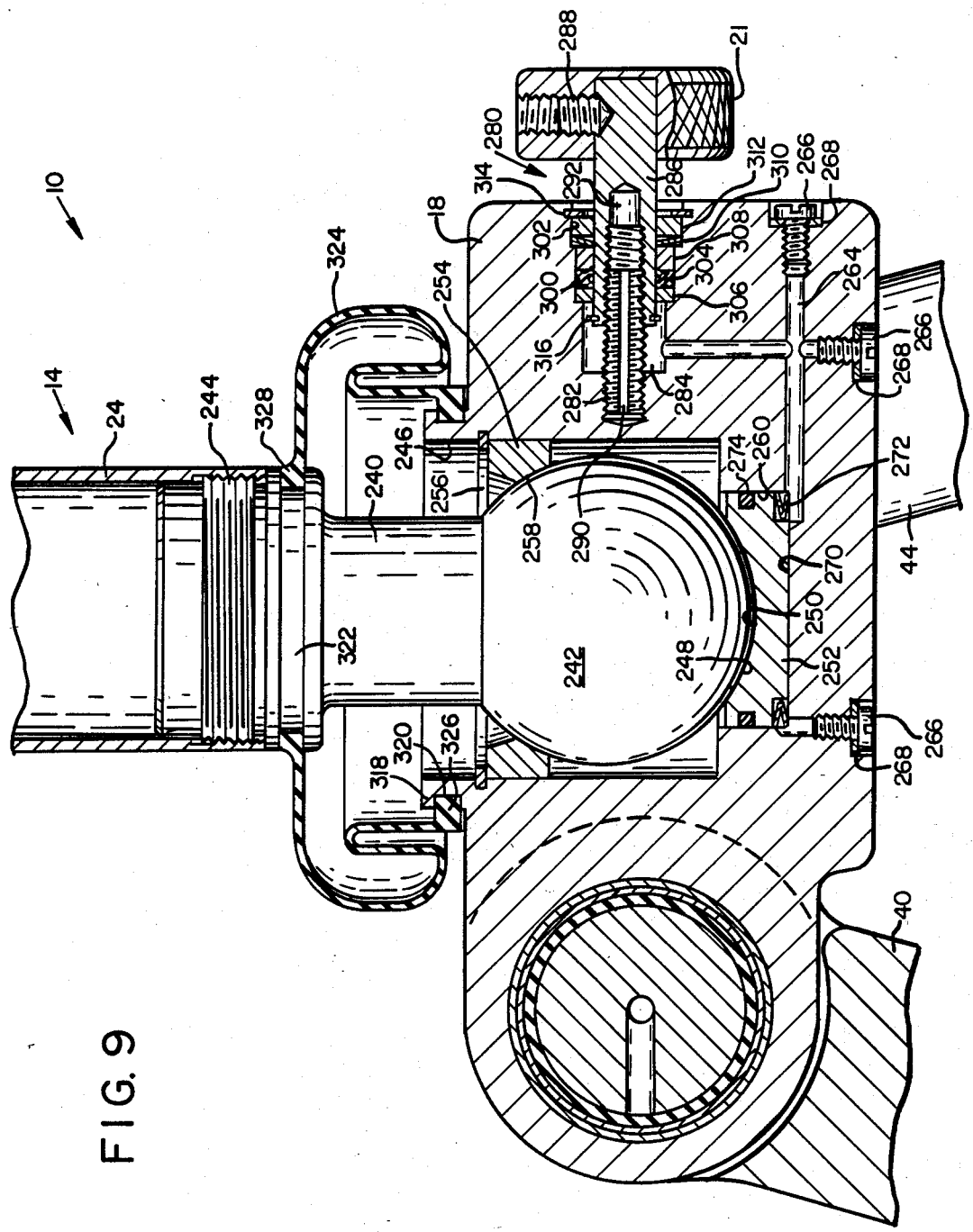
FIG. 9 is a vertical sectional view taken through the hip portion of the apparatus of FIG. 1.

One form of mechanism for locking shaft 14 against tilting movement relative to hip 18 is shown in FIG. 9.

As shown in this FIGURE, the shaft 14 includes a lower stub shaft 240 which terminates in a ball 242. Stub shaft 240 is threaded onto, and is thereby connected to, the lower shaft section 24 at 244. The hip 18 comprises a hip block having a upwardly opening socket 246 formed therein and sized for loosely receiving the ball 242. The curved lower surface 248 of the ball rests against the upper correspondingly curved surface 250 of a movable hydraulic piston 252 positioned within the hip. Piston 252 slides within a bore 260 of the hip toward and away from the surface 248 of the ball. A split annular ball retaining collar 254 is retained within socket 246 by a retaining ring 256. Collar 254 has a bearing surface 258 which abuts the adjacent surface of ball 242. With this construction, the ball, and thus shaft 14, is universally mounted to the hip 18 for tilting movement within limits defined by the components of the hip. As a specific example, the components as shown permit movement of the shaft through an angle of approximately nineteen degrees in any direction from vertical.

In the illustrated embodiment, a hydraulic mechanism is provided for moving piston 252 to lock shaft 14 in place. In connection with this mechanism, a hydraulic fluid receiving chamber 264 is formed within hip 218. This chamber communicates, by way of several bleed openings to the exterior of the hip. These openings are closed by bleed screws 266 and seals 268 and provide a means by which air and fluid may be drained from the hydraulic fluid chamber 264 as it is filled. Chamber 264 includes a minute gap or space 270 between an internal surface of the hip at the base of bore 260 and the lower surface of piston 252. An annular compressable spring 272 bears against the hip and lower surface of the piston. This spring 272 comprises a means for preloading the hip piston 252 against the ball 242. Typically, approximately thirty pounds of preload is applied. Thus preload prevents the shaft 14 from loosely flopping from side to side when hydraulic pressure is relieved in chamber 264. A commercially available four lobed seal 274 is positioned in an annular groove about the perimeter of piston 252 for sealing the space between the sides of the piston and the bore 260.

A manually actuated hydraulic pump 280 is provided for varying the hydraulic fluid pressure in chamber 264 to force the piston 252 against ball 242 and thereby lock shaft 14 against tilting movement relative to the hip. The illustrated mechanism 280 includes an externally threaded shaft 282 mounted to hip 18 and projecting into an enlarged section 284 of hydraulic chamber 264. A pressure control shaft 286 is threaded onto shaft 282. The knob 21 is coupled to shaft 286, as by a set screw 288, so that rotation of the knob 21 advances shaft 286 into or out of chamber section 284. This varies the volume of the overall hydraulic chamber 264 and in turn varies the fluid pressure within the chamber. A groove 290 is formed in the exterior surface of shaft 282 to permit hydraulic fluid to flow between chamber section 284 and the interior 292 of control shaft 286 as knob 21 is turned.

The chamber section 284 is of a first diameter as shown. The hip 18 also has an intermediate bore 300, adjacent chamber section 284, which is of a greater diameter than that of the chamber section. An outer bore 302, of a greater diameter than intermediate bore 300, is included in the hip 18 adjacent to and extending coaxially with the bore 300. An annular four lobed seal 304 is placed in bore 300 between a pair of rings 306, 308 for sealing hydraulic chamber section 284 against leakage at this location. A dished or belleville washer or spring is positioned in outer bore 302 against ring 308. A ring 312, also in outer bore 302, bears against the dished washer and is retained in place by a retainer 314 coupled to the hip. A retaining ring 216 is mounted to the surface of shaft 286 to prevent removal of the shaft from the hip during use.

Dished washer 310 comprises one form of a fluid accumulator means. That is, as fluid pressure increases within hydraulic fluid chamber 264, spring 310 is eventually compressed because rings 300 and 308, as well as seal 304, slide along shaft 286 toward this spring. Consequently, excessive pressures in the hydraulic fluid chamber 264 are prevented. In addition, the volume displaced by shaft 286, before this shaft bottoms out on shaft 282, is sized to control the maximum pressure in the chamber 264. Typically, piston 252 is shifted only about three to five thousandths of an inch to lock the ball in place. In addition, typical maximum fluid pressures within chamber 264 range from 700 to 1000 psi. These pressures are easily achieved within hydraulic chamber 264 merely by manually turning knob 21.

Hip 18 includes an upwardly projecting flange 318 having an outwardly facing groove 320. An upper end portion of stub shaft 240 is also provided with an outwardly facing groove 322. A boot 324, of a resilient flexible material such as neoprene, has a lower bead 326 positioned within groove 320 and an upper bead 328 positioned within groove 322. These beads are secured within these grooves to hold the boot in place. Boot 324 seals the hip assembly from dust, rain and the like. Yet, boot 324 permits the desired tilting movement of shaft 14 relative to the hip.

Leg Position Locking Mechanism

Figures 10, 11:
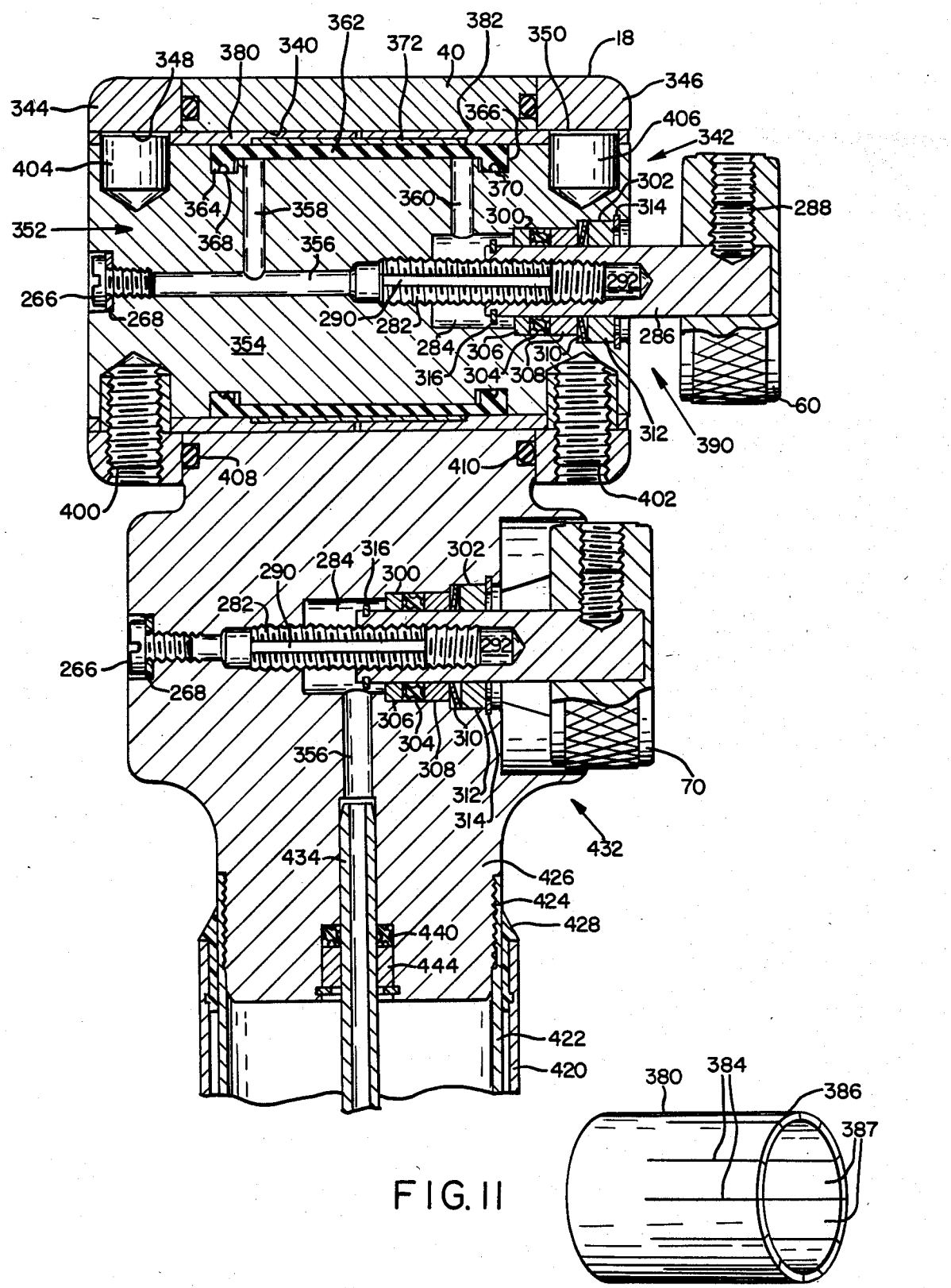
FIG. 10 is a vertical sectional view through the upper end of a leg of the apparatus of FIG. 1, showing a leg position locking mechanism used in the apparatus together with a portion of a leg length locking mechanism included therein.
FIG. 11 is a perspective view of an expansion sleeve included in the leg position locking mechanism of FIG. 10, and in other locking mechanisms of the apparatus, for locking purposes.

With reference to FIGS. 10 and 11, the leg position locking mechanism for leg 40 will next be described. A similar locking mechanism is provided for each of the other legs 42, 44.

In general, the leg 40 has a wall 340 which bounds a pin receiving opening through an upper end of the leg. This pin receiving opening is generally circular in cross-section and oriented to have a substantially horizontal axis. A pivot pin means, one form being indicated at 342, is positioned in the pivot pin receiving opening 340. This pivot pin means pivots the leg 40 to hip 18 for pivoting about a horizontal pivot axis. The pivot pin means 342 is selectively expandable in outside dimension to releasably grip the wall 340 and thereby lock the leg 40 against movement relative to the hip. Means, such as manually actuated hydraulic leg position locking means, are included in this assembly for expanding the pivot pin means to accomplish this locking action.

In the illustrated embodiment, hip 18 is provided with a pair of spaced apart ear flanges 344, 346 which receive the upper end of leg 40 therebetween as shown in FIG. 10. Flanges 344, 346 have respective openings 348, 350 which are sized and oriented to be aligned with opening 340 when leg 40 is in position. A pivot pin assembly 352 is inserted through these openings to pivot the leg 40 to the flanges 344 and 346 and thereby to hip 18. Pivot pin assembly 352 includes a pin body 354 with a hydraulic chamber 356 which communicates through passageways 358, 360 with the exterior of the pin body. An annular bladder 362 of a resilient material, such as neoprene, surrounds the pin body and seals the hydraulic chamber 356 at the exterior of the pin body. The bladder has enlarged lip end sealing portions 364, 366, each of a double O-ring configuration. These end portions 364, 366 are positioned in respective spaced apart annular grooves 368, 370 in the exterior surface of pin body 354. A thin cylindrical bendable split reinforcing sleeve 372, for example of polyethelene, surrounds the bladder 362. This sleeve protects the bladder during installation and use.

First and second cylindrical or annular wall gripping sleeves 380, 382 are positioned to surround the bladder 362. These sleeves have exterior surfaces which contact the wall 340 of the pin receiving opening. As shown in FIG. 11, sleeve 380 is provided with plural longitudinally extending spaced apart slits, some being numbered 384, from one end 386 thereof. These slits define fingers 387, therebetween, which overlie the reinforcing sleeve 372 and thus the bladder.

A manually actuated hydraulic pump mechanism 390, which may be of the same form as mechanism 280 described above, is operable to selectively increase the hydraulic fluid pressure in chamber 356. When this happens, bladder 362 expands and forces the fingers 387 into gripping engagement with wall 340 so as to lock the leg 40 against pivoting movement relative to the hip. Since mechanism 390 is like mechanism 280, it will not be described in detail. However, corresponding elements are provided with corresponding numbers. Again, as described above, a dished washer 310 acts as a fluid accumulator in this pump mechanism. Typically, when hydraulic fluid pressure increases to from about fifty to sixty psi, the fingers 386 are shifted into gripping engagement with wall 340. When fully locked, hydraulic pressures in chamber 356 of from 700 to 1000 psi are common.

Lock screws 400, 402 secure the pin body 354 to flanges 344, 346 and prevent relative rotation between the pin assembly 352 and hip. Lock screws 404, 406 also lock the respective wall gripping sleeves 380, 382 to the pin body so that these sleeves do not rotate when the assembly is locked. O-ring dust seals 408, 410 provide environmental protection for the assembly.

This form of leg position locking mechanism is convenient and easy to use. In addition, when locking is complete, the tripod structure is extremely rigid.

Leg Length and Shaft Length Locking Mechanisms

Referring to FIGS. 10, 12 and 13, mechanisms for locking shaft 14 in adjustment as to length and also for locking the legs 40, 42 and 44 as to length are shown.

More specifically, each leg, illustrated in connection with leg 40, includes a first lower and outer tubular leg section 420 and a second inner tubular leg section 422 which is telescopically received by the first leg section. The inner leg section 422 is threadedly connected at 424 to an upper end portion 426 of the leg assembly. A dust seal 428, which may be of plastic or other suitable material, is mounted to leg section 420 for sliding against leg section 422 to prevent dirt from entering the space between these sections.

The inner leg section 422 includes a leg length locking mechanism expandable in outside dimension for gripping the outer leg section to lock the two leg sections against relative movement. When this is accomplished, the leg sections are no longer slidable relative to one another and the length of the leg is established. In the form shown in FIG. 12, this leg length locking means 429 is similar in construction to the locking pin means 342 described above. However, instead of a pin body 354, the mechanism includes a leg locking body 430 as shown. Because mechanism 429 is like the previously described mechanism 342, corresponding elements are numbered with corresponding numbers and will not be described in detail. It should be noted, however, that relative rotation between leg sections 420 and 422 is not a significant problem. Therefore, only the lower most gripping sleeve 380 is secured to the leg locking body 430 by lock screws.

Hydraulic fluid is delivered to the leg length locking mechanism by a manually actuated hydraulic pump 432 as shown in FIG. 10. This pump is controlled by knob 70 and is of the same construction as the pump 390 described above. Therefore, corresponding elements of this pump are numbered with corresponding numbers and will not be described in detail.

A hydraulic fluid conducting tube 434 communicates from hydraulic fluid chamber 356 to the remainder of this chamber which is included within leg length locking body 430 (FIG. 12). As shown in FIG. 12, a pair of four lobed annular seals 440, 442 surround the upper and lower ends of tube 434 for sealing purposes. Respective retaining rings 444, 446 are clamped against seals 440, 442 to complete the seal.

With this construction, and also in part because of the length of the leg length locking body 430, the legs are extremely rigid even when locked in their positions of furthest extension.

The locking mechanism 459 for shaft 14 is shown in FIG. 13. This mechanism is virtually identical to the leg length locking mechanism 429 except that a shaft length locking body 460, like leg length locking body 430, is used. An identical hydraulic fluid pumping mechanism (not shown), but like pump 432, is used to apply hydraulic fluid pressure to the shaft length locking mechanism to lock the shaft in the desired length.

To provide a more complete description of the illustrated embodiment, but not as a limitation to the scope of the invention, the length of the legs when fully collapsed is approximately twenty-eight inches. When fully extended, the legs are about forty-five inches long. These dimensions are from the center line of the wall opening 340 to the base of a cap 470. In addition, the shaft length, measured from the center of ball 242 to the top of mounting plate 108 ranges from about thirty to forty inches, depending upon whether the shaft is contracted or extended. With the legs extended as described, the tripod assumes a highly stable giraffe-like stance.

Moreover, with the legs angled at about thirty-seven degrees relative to hip 18, the overall height of the tripod and head varies from about fifty inches (with the legs and center shaft retracted) to about seventy-five inches (with the legs and center shaft fully extended). These measurements are taken from a level floor engaged by leg caps 470 to the top of mounting plate 108. Therefore, the tripod may be placed in an extremely stable condition for use by individual of various heights.

In addition, the entire tripod and head is only about thirty-two inches long when totally collapsed as shown in FIG. 2.

Leg Caps

The lower or distal ends of the legs are each provided with a cap 470 (FIGS. 1 and 12). These caps greatly enhance the performance of the tripod because they are specially designed to engage both irregular and regular surfaces to provide a stable contact for the tripod legs. Moreover, stability is provided when the legs, such as leg 44 in FIG. 4, are extended in a substantially horizontal orientation. In addition, the tripod has been tested with one, and even two, of the legs leaning against a wall and found to be extremely stable in this orientation as well.

Referring again to FIG. 13, the cap has a body 472 with a lower portion which is generally hemispherical. A means is provided for connecting the upper portion of the body to the end of the leg. In this illustrated form, cap 470 has an opening 474 sized for receiving the end of tubular leg section 420. In addition, the illustrated cap is spherical so that the upper portion of the cap provides a bearing surface when in contact with the ground or other support surface.

The cap body 472 is preferably of a material with a durometer which is in the range of from 40 to 90, and more preferably in the range of from 60 to 65. In addition, the cap 472 has a coefficient of friction which is similar to that of natural rubber or neoprene. Moreover, the cap has a diameter which is approximately within the range of from one to two times the diameter of the leg section to which the cap is mounted. In the preferred form, the cap has a diameter which is from 1.25 to 1.35 times the cross-sectional dimension of the connected leg section 420.

With caps of this configuration, as well as with the hydraulic locking mechanisms described above, the tripod of the invention is extremely stable and rigid under widely varying conditions of use. However, this rigidity and stability is achieved to a high degree even without this specific form of caps.

Operation

With reference to FIGS. 1 through 5, a tripod and head assembly in accordance with the present invention is typically transported in its collapsed state shown in FIG. 2.

When the location for photographic shooting is reached, the tripod is set up, such as shown in FIG. 1 with a camera attached to the camera mounting plate 108 (see FIG. 6) and carried by the instrument supporting head.

Prior to attaching the camera in place, the legs 40, 42 and 44 are individually extended or retracted until the hip 18 is somewhat level. However, precise leveling of hip 18 is not required. Typically, for greatest stability, the legs are spread in an extremely wide giraffe-like stance, with shaft 14 extending upwardly. In addition, because of the rigidity of the locking mechanisms and the tripod assembly itself, the legs may be extended in a horizontal orientation and still rigidly support a mounted camera. For example, in nature photography it is sometimes desirable for the photographer to dig a pit in which to hide while waiting for birds or other animals to approach. With a tripod of this invention, the legs may be spread across the pit opening in a horizontal orientation. Once positioned, the tripod center shaft 14 may be adjusted to a height where only a slight movement of the photographer is required to bring the photographer's eyes to the level of the camera optics. Consequently, the photographer need not stand or jump out of a pit to take photographs. Any such movement would risk scaring away the animals or birds.

Continuing with the description, once the legs are positioned, the shaft is adjusted for proper height and locked into place by turning knob 30 to control the shaft length locking mechanism. In addition, the hip locking mechanism is released, by turning knob 21, to permit tilting of shaft 14 to level the instrument supporting head 12 with respect to the horizon. Again, a leveling mechanism (not shown) may be mounted to the shaft for this purpose. The shaft may be tilted to other orientations if required to obtain particular shots.

Once the tripod is setup, the camera is mounted to mounting plate 108 and then positioned on the instrument supporting head 12 and locked in place. The gap between plate 104 and panning mechanism 80 provides easy access to knob 118 for shifting locking bar 116 into locking engagement with the plate 108 (FIG. 7).

The panning and tilting mechanism 80, 82 are adjusted, as previously explained, to establish the desired drag on the panning and tilting movement. Once the camera is set, photography can commence.

This tripod and instrument supporting head is so rigid and stable that the camera may be panned through 360 degrees without loss of stability. In addition, the tilt drag may be easily varied to balance, or be slightly in excess of, the tilting force exerted by the camera on the instrument support head 12. Consequently, the photographer can walk away from from the tripod without fear of the camera falling over and tipping tee assembly. Yet, by exerting the slightest force on lever 88, the camera can be tilted as required during shooting.

In addition, the tripod and head of the present invention can stably support cameras weighing from fifteen to one hundred pounds or more.

Having illustrated and described the principles of our invention with reference to one preferred embodiment, it should be apparent to those persons skilled in the art that such invention may be modified in arrangement and detail without departing from such principles.

We claim as our invention all such modifications as come within the true spirit and scope of the following claims.

1. A tripod comprising:
   a body with a lower hip;
   three legs arranged in tripod fashion, the legs having upper ends which are adjustably mounted to the hip so as to project from the hip in various directions to stably support the body;
   leg position locking means for selectively locking the legs against movement relative to the hip;
   the body including an elongated upright shaft having a lower end mounted to the hip for universal tilting movement on said hip within limits;
   hip locking means for selectively locking the shaft against tilting movement relative to the hip;
   the legs being adjustable as to length;
   means for releasably holding the legs in adjustment;
   the leg position locking means comprising means for independently locking each of the legs against movement relative to the hip; and
   the leg position locking means comprising hydraulic leg position locking means for locking the respective legs in any position of adjustment relative to the hip.

2. A tripod according to claim 1 including means for pivoting each of the legs to the hip for pivoting about respective substantially horizontal pivot axes through an arc of approximately one hundred and eighty degrees.

3. A tripod comprising:
   a body with a lower hip;
   three legs arranged in tripod fashion, the legs having upper ends which are adjustably mounted to the hip so as to project from the hip in various directions to stably support the body;
   leg position locking means for selectively locking the legs against movement relative to the hip;

the body including an elongated upright shaft having a lower end mounted to the hip for universal tilting movement on said hip within limits;

hip locking means for selectively locking the shaft against tilting movement relative to the hip;

the legs being adjustable as to length;

means for releasably holding the legs in adjustment; and each leg having a wall bounding a pivot pin receiving opening through an upper end thereof and oriented such that the pivot pin receiving opening has a substantially horizontal axis, the hip including plural pivot pin means, one such pivot pin means being associated with each leg and received in the pivot pin receiving opening of the associated leg, the pivot pin means comprising means for pivoting each of the legs to the hip for pivoting about respective substantially horizontal pivot axes, each pivot pin means being selectively expandable in outside dimension to releasably grip the wall of the pivot pin receiving opening which receives the pivot pin means and thereby lock the legs against movement relative to the hip, the leg position locking means comprising means for selectively expanding the pivot pin means in outside dimension to lock the legs against movement relative to the hip.

4. A tripod according to claim 3 in which the leg position locking means comprises manually actuated hydraulic leg position locking means for selectively and independently expanding each of the pivot pin means in outside dimension to thereby lock each of the legs against movement relative to the hip.

5. A tripod comprising:

a body with a lower hip;

three legs arranged in tripod fashion, the legs having upper ends which are adjustably mounted to the hip so as to project from the hip in various directions to stably support the body;

leg position locking means for selectively locking the legs against movement relative to the hip;

the body including an elongated upright shaft having a lower end mounted to the hip for universal tilting movement on said hip within limits;

hip locking means for selectively locking the shaft against tilting movement relative to the hip;

the legs being adjustable as to length;

means for releasably holding the legs in adjustment;

the shaft being adjustable in length;

manually actuated hydraulic means for releasably locking the shaft against further adjustment in length to releasably hold the shaft at a fixed length; and the shaft including a first tubular section and a second tubular section telescopingly received by the first section, the second section including expandable shaft locking means for expanding in outside dimension in response to hydraulic pressure so as to releasably grip the first shaft section and restrain the shaft sections from further relative movement, thereby releasably holding the shaft at a fixed length.

6. A tripod comprising:

a body with a lower hip;

three legs arranged in tripod fashion, the legs having upper ends which are adjustably mounted to the hip so as to project from the hip in various directions to stably support the body;

leg position locking means for selectively locking the legs against movement relative to the hip;

the body including an elongated upright shaft having a lower end mounted to the hip for universal tilting movement on said hip within limits;

hip locking means for selectively locking the shaft against tilting movement relative to the hip;

the legs being adjustable as to length;

means for releasably holding the legs in adjustment; and the means for releasably holding the legs in adjustment comprising manually actuated hydraulic leg length locking means for selectively and independently releasably holding each of the legs in any position of adjustment as to length.

7. A tripod according to claim 6 in which each leg includes a first tubular leg section and a second tubular leg section telescopingly received by the first leg section, the second leg section including a leg length locking portion expandable in outside dimension in response to manually generated hydraulic pressure for gripping the first leg section to lock the two leg sections against relative movement and thereby releasably hold the length of the leg, the leg length locking means comprising means for selectively expanding the leg length locking portions in outside dimension to lock the first and second leg sections against relative movement.

8. A tripod according to claim 7 in which the first leg sections are mounted to the hip and the second leg sections are spaced from the hip, the second leg sections each having a distal end, a respective leg cap or foot mounted to the distal end of each of the second leg sections, the leg caps being generally spherical and of a cross-sectional dimension which is greater than the cross-sectional dimension of the second leg sections, the leg caps being of a rubber-like material of a durometer which is in the approximate range of from 60 to 65.

9. A tripod comprising:

a body with a lower hip;

three legs arranged in tripod fashion, the legs having upper ends which are adjustably mounted to the hip so as to project from the hip in various directions to stably support the body;

leg position locking means for selectively locking the legs against movement relative to the hip;

the body including an elongated upright shaft having a lower end mounted to the hip for universal tilting movement on said hip within limits;

hip locking means for selectively locking the shaft against tilting movement relative to the hip;

the legs being adjustable as to length;

means for releasably holding the legs in adjustment; and manually actuated hydraulic hip locking means for selectively locking the shaft against tilting movement relative to the hip.

10. A tripod comprising:

a body with a lower hip;

three legs arranged in tripod fashion, the legs having upper ends which are adjustably mounted to the hip so as to project from the hip in various directions to stably support the body;

leg position locking means for selectively locking the legs against movement relative to the hip;

the body including an elongated upright shaft having a lower end mounted to the hip for universal tilting movement on said hip within limits;

hip locking means for selectively locking the shaft against tilting movement relative to the hip;

the legs being adjustable as to length;

means for releasably holding the legs in adjustment; and a camera or instrument mounting head supported by the upper end of said shaft, the head including panning mounting means for coupling the head to the shaft for panning motion about a generally vertical axis, the head including an instrument support member and tilt mounting means for mounting the instrument support member to the head for tilting movement about a generally horizontal tilt pivot axis, the panning mounting means and tilt mounting means each comprising manually adjustable friction brake means for varying the drag on the panning and tilting movement, the friction brake means each including plural friction engagement means of a material having substantially equal coefficients of dynamic and static friction, the friction engagement means being positioned for frictional engagement, and means for varying the force with which the friction engagement means engage one another to vary the drag.

11. A tripod according to claim 10 in which each friction brake means includes means for modulating the force applied to the friction engagement means.

12. A tripod according to claim 11 in which the head is configured to support the instrument carrying support member at a position spaced from the upper end of the shaft to provide a substantial gap between such support member and shaft, this gap accomodating a user's hands for camera and other instrument adjustments during use of the tripod.

13. A tripod comprising: a body with a lower hip; three legs arranged in tripod fashion, the legs having upper ends which are adjustably mounted to the hip so as to project from the hip in various directions to stably support the body; leg position locking means for selectively locking the legs against movement relative to the hip;

the body including an elongated upright shaft having a lower end mounted to the hip for universal tilting movement on said hip within limits;

hip locking means for selectively locking the shaft against tilting movement relative to the hip;

the legs being adjustable as to length;

means for releasably holding the legs in adjustment; and the leg position locking means and hip locking means each comprising manually actuated hydraulic locking means.

14. A tripod according to claim 13 in which the means for releasably holding the legs in adjustment as to length comprises manually actuated hydraulic means for selectively and independently releasably holding each of the legs in any position of adjustment as to length.

15. A tripod according to claim 14 in which the shaft is adjustable in length, the tripod also including manually actuated hydraulic means for releasably holding the shaft in adjustment as to length.

16. A tripod according to claim 15 including a camera or instrument mounting head supported by the upper end of said shaft, the head including panning mounting means for coupling the head to the shaft for panning motion about a generally vertical axis, the head including a camera or other instrument support member and tilt mounting means for mounting the instrument support member to the head for tilting movement about a generally horizontal tilt pivot axis.

17. A tripod comprising:

a body with a lower hip;

three legs arranged in tripod fashion, the legs having upper ends which are adjustably mounted to the hip so as to project from the hip in various directions to stably support the body;

the body including an elongated upright shaft having a lower end mounted to the hip for universal tilting movement on said lower hip within limits;

hip locking means for selectively locking the shaft against movement relative to the hip;

each leg having a wall which bounds a pivot pin receiving opening through an upper end thereof and oriented such that the pivot pin receiving opening has a substantially horizontal axis, the hip including plural pivot pin means, one such pivot pin means being associated with each leg and received in the pivot pin receiving opening of the associated leg, the pivot pin means comprising means for pivoting each of the legs to the hip for pivoting about respective substantially horizontal pivot axes, each pivot pin means being selectively expandable in outside dimension to releasably grip the wall of the pivot pin receiving opening which receives the pivot pin means and thereby lock the legs against movement relative to the hip;

manually actuated hydraulic leg position locking means for selectively and independently expanding each of the pivot pin means to thereby selectively and independently lock each of the legs against movement relative to the hip;

the shaft including a first tubular shaft section and a second tubular shaft section telescopingly received by the first shaft section such that the shaft is adjustable in length, the second shaft section including expandable shaft locking means for expanding in dimension in response to hydraulic pressure so as to grip the first shaft section following telescoping adjustment of the first and second shaft sections, thereby releasably holding the length of the shaft;

manually actuated hydraulic shaft locking means for selectively expanding the shaft locking means to lock the first and second shaft sections against relative movement to thereby lock the shaft at the length to which it is adjusted;

each leg including a first tubular leg section and a second tubular leg section telescopingly received by the first leg section such that each leg is adjustable as to length, the second leg section including a leg length locking means expandable in dimension in response to hydraulic pressure for gripping the first leg section to lock the two leg sections against relative movement and thereby releasably hold the length of the legs; and manually actuated hydraulic leg length locking means for selectively expanding the leg locking portions to lock the first and second leg sections against relative movement to thereby lock the legs at the length to which they are adjusted.

18. A tripod according to claim 17 in which the first leg sections are mounted to the hip and the second leg sections are spaced from the hip, the second leg sections each having a distal end, a respective leg cap or foot mounted to the distal end of each of the second leg sections, the leg caps being generally spherical and of a cross-sectional dimension which is greater than the cross-sectional dimension of the second leg section to which the leg cap is mounted, the leg caps being of a rubber-like material of a durometer which is in the approximate range of from 60 to 65.

19. A tripod according to claim 17 which also includes a camera or instrument mounting head supported by the upper end of said shaft, the head including panning mounting means for coupling the head to the shaft for panning motion about a generally vertical axis, the head including a camera or other instrument supporting member and tilt mounting means for mounting the support member to the head for tilting movement about a generally horizontal tilt pivot axis; and the panning mounting means and tilt mounting means each comprising manually adjustable friction brake means for varying the drag on the panning and tilting movement, the friction brake means each including plural friction engagement means of a material having substantially equal coefficients of dynamic and static friction, the friction engagement means being positioned for frictional engagement, and means for varying the force with which the friction engagement means engage one another to vary the drag, each friction brake means including means for modulating the force applied to the friction engagement means.

20. A tripod according to claim 19 in which the head is configured to support the instrument supporting member at a position spaced from the upper end of the shaft to provide a substantial gap between such support member and shaft thereby accomodating a user's hands within the gap to permit camera and other instrument adjustments during use of the tripod.

21. A tripod according to claim 19 including means mounted to the head and projecting from the head for engagement with the torso of a user so that the user may control the tilting and panning movement of the head, and thus of a camera or other instrument supported by the head, by torso movements.

22. An instrument support comprising:
an upright instrument supporting body;
at least three legs;
leg pivot means each associated with a respective one of the legs for coupling the legs to the body for pivoting about respective generally horizontal pivot axes to various positions relative to the body;
manually actuated leg position hydraulic locking means for selectively and independently locking each of the legs in position relative to the body.

23. An instrument support comprising:
an upright instrument supporting body;
at least three legs;
leg pivot means each associated with a respective one of the legs for coupling the legs to the body for pivoting about respective generally horizontal pivot axes to various positions relative to the body;
manually actuated leg position hydraulic locking means for selectively and independently locking each of the legs in position relative to the body;
each leg having a wall which bounds a pivot pin receiving opening through an upper end thereof and oriented so as to have a substantially horizontal axis, the hip including plural pivot pin means, one such pivot pin means being associated with each leg and received in the pivot pin receiving opening of the associated leg, the pivot pin means comprising means for pivoting each of the legs to the hip for pivoting about respective substantially horizontal pivot axes, each pivot pin means being selectively expandable in outside dimension to releasably grip the wall of the pivot pin receiving opening which receives the pivot pin means and thereby lock the legs against movement relative to the hip.

24. An instrument support according to claim 23 including manually actuated hydraulic leg position locking means for selectively and independently expanding each of the pivot pin means in outside dimension to thereby lock each of the legs against movement relative to the hip.

25. An instrument support according to claim 24 in which each pivot pin means includes a pin body having a hydraulic chamber communicating with the exterior of the pin body, an annular bladder of a resilient material surrounding the pin body and sealing the hydraulic chamber at the exterior of the pin body, the bladder having enlarged lip end sealing portions of a double O-ring configuration, the exterior of the pin body having a pair of spaced apart annular grooves positioned to receive the respective lip end seal portions, an annular reinforcing sleeve surrounding the bladder, first and second annular wall gripping sleeves surrounding the reinforcing sleeve and having exterior surfaces which contact the wall of the pin receiving opening, the wall gripping sleeves each having plural slits from one end thereof to define fingers therebetween which are positioned to overlie the bladder, a manually actuated hydraulic pump for increasing the pressure on hydraulic fluid within the hydraulic chamber to expand the bladder and thereby the fingers into gripping engagement with the wall, the hydraulic group including fluid accumulator means for storing hydraulic fluid from the chamber as the pressure in the chamber increases.

26. An instrument support comprising:
an instrument supporting body having a lower hip;
the body including an elongated upright shaft having a lower end formed in a ball and mounted to the hip for universal tilting movement on the hip within limits;
at least three legs coupled to the body for supporting the body in an upright orientation;
manually actuated hydraulic hip locking means for selectively locking the ball and thereby the shaft against tilting movement relative to the hip.

27. An instrument support according to claim 26 in which the hip locking means includes a hip locking piston means positioned within the hip and movable in response to hydraulic fluid pressure into locking engagement with the ball, thereby locking the shaft against tilting movement, the hip including a hydraulic fluid chamber in communication with the hip piston means, a manually operated hydraulic pump for increasing the pressure on hydraulic fluid within the hydraulic chamber to shift the hip piston means into locking engagement with the ball, the hydraulic pump including fluid accumulator means for storing hydraulic fluid from the chamber as the pressure in the chamber increases.

28. An instrument support according to claim 22 in which the hip locking means includes means for biasing the hip piston means against the ball with a preloading force.

29. An instrument support comprising:
an instrument supporting body;
at least three legs coupled to the body for supporting the body;
the legs being adjustable as to length; and manually actuated hydraulic leg length locking means for selectively and independently releasably holding each of the legs in any position of adjustment as to length.

30. An instrument support according to claim 29 in which each leg includes a first tubular leg section and a second tubular leg section telescopingly received by the first leg section, the second leg section including a leg length locking means expandable in outside dimension in response manually generated to hydraulic pressure for gripping the first leg section to lock the two leg sections against relative movement and thereby releasably hold the length of the leg, the leg length locking means comprising means for selectively expanding the leg length locking portions in outside dimension to lock the first and second leg sections against relative movement.

31. An instrument support according to claim 30 in which each leg length locking means includes a leg locking body having a hydraulic chamber communicating with the exterior of the leg locking body, an annular bladder of a resilient material surrounding the leg locking body and sealing the hydraulic chamber at the exterior of the leg locking body, the bladder having enlarged lip end sealing portions of a double O-ring configuration, the exterior of the leg locking body having a pair of spaced apart annular grooves positioned to receive the respective lip end seal portions, an annular reinforcing sleeve surrounding the bladder, first and second annular leg section gripping sleeves surrounding the reinforcing sleeve and having exterior surfaces which contact the first leg section, the leg section gripping sleeves each having plural slits from one end thereof to define fingers therebetween which are positioned to overlie the bladder, a manually actuated hydraulic pump for increasing the pressure on hydraulic fluid within the hydraulic chamber to expand the bladder and thereby the fingers into gripping engagement with the first leg section, the hydraulic pump including fluid accumulator means for storing hydraulic fluid from the chamber as the pressure in the chamber increases.

32. An instrument support according to claim 30 in which the first leg sections are mounted to the body and the second leg sections are spaced from the body, the second leg sections each having a distal end, a respective leg cap or foot mounted to the distal end of each of the second leg sections, the leg caps being generally spherical and of a cross-sectional dimension which is greater than the cross-sectional dimension of the second leg sections, the leg caps being of a rubber-like material of a durometer which is in the approximate range of from 60 to 65.

33. An instrument supporting head for a tripod or other instrument support structure comprising:
  a base;
  the base including panning mounting means for coupling the base and thereby the head to the instrument support structure for panning motion about a generally vertical axis;
  an instrument support member;
  tilt mounting means for mounting the instrument support member to the head for tilting movement about a generally horizontal tilt pivot axis;
  the panning mounting means and tilt mounting means each comprising manually adjustable friction brake means for varying the drag on the panning and tilting movement, the friction brake means each including plural friction engagement means of a material having substantially equal coefficients of dynamic and static friction, the friction engagement means being positioned for frictional engagement, and means for varying the force with which the friction engagement means engage one another to thereby vary the drag.

34. An instrument supporting head according to claim 33 in which each friction brake means includes means for modulating the force applied to the friction engagement means.

35. An instrument supporting head according to claim 33 in which the instrument support member is supported by the tilt mounting means so as to provide a substantial gap between such support member and the base, this gap accommodating a user's hands for camera and other instrument adjustments during use of the instrument supporting head.

* * * * *

UNITED STATES PATENT AND TRADEMARK OFFICE
CERTIFICATE OF CORRECTION

PATENT NO. : 4,886,230
DATED : December 12, 1989
INVENTOR(S) : John A. Jones, L. Mark Marchus and Loren S. Hardy It is certified that error appears in the above-identified patent and that said Letters Patent is hereby corrected as shown below:

<u>In the Claims</u>:

In column 22, line 60, "claim 22" should be --claim 27--.

Signed and Sealed this

Twelfth Day of March, 1991

*Attest:*

HARRY F. MANBECK, JR.

*Attesting Officer*     *Commissioner of Patents and Trademarks*